Patented Dec. 27, 1949

2,492,203

UNITED STATES PATENT OFFICE 2,492,203

ESTERS OF METHACRYLIC ACID

Robert H. Treadway, Wyndmoor, Pa., assignor to the United States of America as represented by the Secretary of Agriculture No Drawing. Application January 15, 1946, Serial No. 641,355

9 Claims. (Cl. 260—17.4)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to new compositions of matter and particularly to the methacrylic acid esters of carbohydrates, such as starch, dextrin, maltose, and glucose.

An object of this invention is to provide new compositions of matter, including the methacrylic acid esters of carbohydrates of the type mentioned, and a process for their preparation.

Another object is to provide new polymerizable compositions which can be molded into rigid plastics or used in solutions as coatings and finishes for paper, wood, metal, glass and other materials.

In general, the esters are prepared in accordance with this invention by treating the carbohydrate dispersed in pyridine with methacrylic anhydride under suitable conditions more fully disclosed and illustrated in the following examples. Starch methacrylate prepared in accordance with this invention is polymerizable and useful in the manufacture of plastics and related compositions. The dextrin, maltose, and glucose methacrylates are useful as sizes, coatings, finishes for paper, cloth, wood, metal, glass and other materials. The latter methacrylates may also be polymerized to produce rigid gels.

In preparing starch methacrylate in accordance with this invention, starch is first pretreated by gelatinizing in aqueous pyridine. The water is then removed by an azeotropic distillation, leaving a white, fluffy product. The starch is then esterified with methacrylic anhydride, using pyridine as the solvent. An example of this procedure is as follows:

Example 1

48.3 grams of gelatinized starch containing 16.2 grams of dry starch (0.1 mole of anhydro glucose unit) and 32.1 grams of pyridine-benzene mixture, mainly pyridine, were mixed with 74 grams of pyridine and 69.3 grams (0.45 mole) of methacrylic anhydride. The reaction was carried out for 26 hours at 95° C. The product was a brown, nearly clear, viscous mass. The starch ester precipitated readily on pouring into cold water to give a light brown solid. It was washed, filtered, and then dried in air. The product was partially soluble in pyridine and ethylene chlorohydrin and virtually insoluble in other common organic solvents.

The dried starch methacrylate was almost white. It became plastic when heated to 140° C. and was then insoluble in all organic solvents. Analysis of the starch ester by saponification in alcoholic alkali at room temperature gave 55.6% methacrylyl in comparison to 56.6% methacrylyl for starch trimethacrylate, indicating almost complete substitution (2.9). Products of lower degree of substitution can be obtained by reacting for a shorter time or by reduction of the amount of anhydride used.

Starch methacrylate when mixed with 20–40% diethyl phthalate as plasticizer and molded at about 140° C. under about 2.3 tons/square inch pressure results in a translucent plastic that is strong, hard, and insoluble in all common organic solvents.

The following example illustrates the method of preparing dextrin methacrylate:

Example 2

The dextrin was pretreated by pasting in an equal weight of 90% pyridine-10% water before esterification. Methacrylic anhydride, sufficient for reaction with the water in the paste to produce methacrylic acid and to provide for 50% excess over the requirement for complete substitution, was then added. The reaction was carried out at 95° C. for 12 hours, and the product was recovered by pouring the clear, brown, reaction mass into ice water. The ester was washed well and then dried. It gave 57.3% methacrylyl upon saponification in alcoholic alkali at room temperature, indicating a complete substitution.

Dextrin methacrylate prepared as indicated above is a nearly white powder and very soluble in a large variety of organic solvents, including glacial acetic acid, acetone, ethylene chlorohydrin, chloroform, carbon tetrachloride, 2-nitropropane, and ethyl ether. It softens, but does not dissolve in methanol and ethanol. It is insoluble in hydrocarbons. Upon heating to 105°–110° C., it softens and becomes transparent.

15 grams of dextrin methacrylate was dissolved in 40 cc. of vehicle of the following composition in relative parts by volume: Butyl acetate 6, toluene 4, N-butyl alcohol 2, ethyl acetate 1, ethyl alcohol 1, and a varnish drier 4. The resulting lacquer was brushed on wood and glass to give glossy films. The films were first allowed to air dry and then were heated up gradually in an oven, taking 2 hours to reach 100° C. The temperature was then raised to 120° C. and held there for 2 hours. The baked films were hard, transparent, free from cracks and checks and were insoluble in all types of organic solvents.

The following example illustrates the method of preparing maltose octa-methacrylate:

*Example 3*

36.0 grams of maltose monohydrate (0.1 mole) was dispersed in 120 grams of pyridine and 200.4 grams of methacrylic anhydride was then added for reaction with the maltose. Reaction was carried out for 10 hours at 65° C., with stirring, and the clear, brown product was recovered by pouring into ice water. The sirupy maltose ester was purified by washing with water and then extracted with cold petroleum ether to harden the ester to a solid. The product gave, upon analysis, 62.3% methacrylyl, which corresponds closely with maltose octa-methacrylate (62.5% methacrylyl). The white powder softened at 45°–50° C. and became transparent. It was very soluble in practically all organic solvents, except hydrocarbons.

The following example illustrates the method of preparing glucose penta-methacrylate:

*Example 4*

30 grams of pure glucose was dispersed in 150 grams of pyridine and then 192 grams of methacrylic anhydride was added. The reaction was carried out for 3½ hours at 65° C. The clear solution was then poured into ice water to give a sirup which settled. Approximately 20 grams of white, needle-shaped crystals separated from the sirup upon standing. The product was recrystallized several times. Analysis by saponification in a mixture of acetone and aqueous alkali at 0° C. gave 66.3% methacrylyl in comparison with the theoretical of 66.4% methacrylyl for penta substitution. The crystals were very soluble in acetone, chloroform, acetic acid, benzene, ether, warm methanol and warm ethanol and insoluble in hydrocarbons.

The methacrylic esters of dextrin, maltose, and glucose may be applied from solutions to produce sizes, coatings, and finishes for paper, cloth, wood, metal, glass, and other materials. Either a single solvent or a mixture of solvents may be used to dissolve the esters.

The methacrylic acid esters of dextrin, maltose, and glucose may also be polymerized at ordinary temperatures, particularly when catalysts are added. Three samples of 50% solutions in pure chloroform were set aside at room temperature. One sample contained 0.5% benzoyl peroxide based on the weight of ester, the second sample contained 0.2% cobalt (added as 6% cobalt naphthenate) also based on the weight of ester, and the third sample contained no polymerization catalyst. The sample containing cobalt gelled after 2 days standing and the sample containing benzoyl peroxide, after 4 days. The control did not gel until after 16 days standing. Solutions of maltose and glucose methacrylates in chloroform, to which benzoyl peroxide or cobalt naphthenate had been added, also polymerized to rigid gels after several days standing at room temperature.

Maltose and glucose sirups have slower-drying finishes than dextrin methacrylate, but are unusually hard after curing. Glucose methacrylate sirup, when spread in a thin layer on wood and exposed first to ultraviolet light for 8 hours and then baked in an air oven at 100° C. for 8 hours, polymerized, in the absence of a catalyst, to a transparent, hard, glossy film which was insoluble in all solvents.

Having thus described my invention, I claim:

1. Methacrylic ester of starch having substantially three methacrylyl ester groups per glucose unit.

2. Methacrylic ester of dextrin having substantially three methacrylyl ester groups per glucose unit.

3. Glucose penta-methacrylate.

4. A methacrylic ester of a carbohydrate of the group consisting of starch, dextrin, maltose, and glucose in which substantially all of the —OH groups of the carbohydrate have been converted to methacrylic acid ester linkage.

5. A plastic comprising a polymerized methacrylic ester, the ester being that defined in claim 4.

6. A plastic comprising polymerized methacrylic ester of starch, the ester having substantially three methacrylyl groups per glucose unit.

7. A plastic comprising polymerized glucose penta-methacrylate.

8. A plastic comprising polymerized methacrylic ester of dextrin, the ester having substantially three methacrylyl groups per glucose unit.

9. A process of preparing methacrylic ester of starch having substantially three methacrylyl ester groups per glucose linkage comprising gelatinizing starch in aqueous pyridine, distilling off the water, forming a reaction mixture of the resulting gelatinized starch with pyridine, benzene, and methacrylic anhydride as sole esterifying agent, and heating until substantially complete reaction is effected between the starch and the anhydride.

ROBERT H. TREADWAY.

REFERENCES CITED

The following references are of record in the file of this patent:

UNITED STATES PATENTS

| Number | Name | Date |
|---|---|---|
| 2,336,985 | Freund | Dec. 14, 1943 |
| 2,338,967 | Pollack | Jan. 11, 1944 |
| 2,370,572 | Muskat | Feb. 27, 1945 |
| 2,411,954 | Burke | Dec. 31, 1946 |

OTHER REFERENCES

Journ. American Chem. Soc., June 1945, vol. 67, pp. 1038–1039.